United States Patent
Nagai et al.

(10) Patent No.: US 6,778,412 B2
(45) Date of Patent: Aug. 17, 2004

(54) SYNCHRONOUS CONVERTER WITH REVERSE CURRENT PROTECTION THROUGH VARIABLE INDUCTANCE

(75) Inventors: Jun Nagai, Sagamihara (JP); Tadahiko Matsumoto, Yokohama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/217,993

(22) Filed: Aug. 14, 2002

(65) Prior Publication Data

US 2003/0048644 A1 Mar. 13, 2003

(30) Foreign Application Priority Data

Sep. 7, 2001 (JP) ........................................ 2001-271916

(51) Int. Cl.[7] .............................................. H02H 7/125
(52) U.S. Cl. ...................... 363/53; 363/21.06; 363/126; 363/127; 361/87
(58) Field of Search ........................ 363/53, 50, 21.06, 363/56.1, 125, 127, 126; 361/87

(56) References Cited

U.S. PATENT DOCUMENTS

| | | | |
|---|---|---|---|
| 5,862,043 A | * 1/1999 | Youn et al. | 363/21.04 |
| 6,181,579 B1 | * 1/2001 | Nagai et al. | 363/21.06 |
| 6,414,861 B1 | * 7/2002 | Matsumoto et al. | 363/56.1 |
| 6,496,395 B2 | * 12/2002 | Tokunaga et al. | 363/97 |
| 6,618,274 B2 | * 9/2003 | Boylan et al. | 363/17 |

FOREIGN PATENT DOCUMENTS

| | | |
|---|---|---|
| JP | 6-343262 | 12/1994 |
| JP | 2001-157444 | 6/2001 |

* cited by examiner

*Primary Examiner*—Shawn Riley
(74) *Attorney, Agent, or Firm*—Keating & Bennett, LLP

(57) ABSTRACT

A DC-DC converter includes a reverse current detector for detecting a reverse current and a reverse current suppressor for increasing an input-output conversion ratio when a reverse current is detected. A choke coil increases the inductance in a current flowing region in which a very small reverse current flows and reduces the inductance in a current flowing region in which the current flowing is greater than or equal to that in a normal operation mode. In a reverse current flowing region in which the output current is negative, the DC-DC converter has unique regulation characteristics in which the amount of change in the output voltage relative to the amount of change in the output current is very large.

32 Claims, 11 Drawing Sheets

D

D

D

D

D

CHOKE COIL CURRENT

SMALL $I_A$

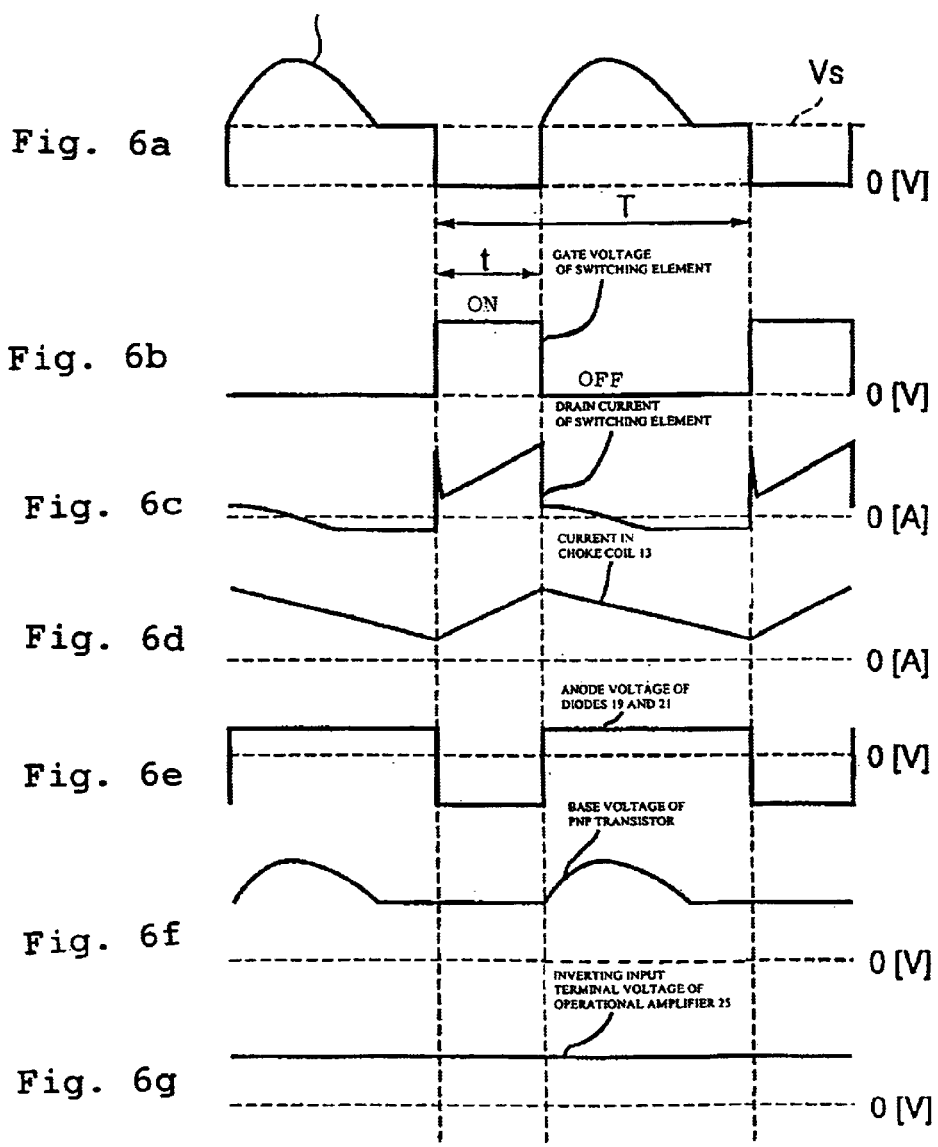

SYNCHRONOUS CONVERTER WITH REVERSE CURRENT PROTECTION THROUGH VARIABLE INDUCTANCE

BACKGROUND OF THE INVENTION

1. Field of the Invention

The present invention relates to DC-DC converters with synchronous rectifiers, for use in, for example, switching power supply apparatuses and other suitable apparatuses.

2. Description of the Related Art

As is commonly known, DC-DC converters incorporated in switching power supply apparatuses are used to convert a DC input voltage Vin into an AC voltage in response to the switching operation of a switching element, e.g., a MOSFET (metal oxide semiconductor field-effect transistor), rectify and smooth the AC voltage by a rectifying/smoothing circuit, and output a DC voltage Vout to a load. In these DC-DC converters, the output voltage Vout can be variably controlled by controlling the switching operation of the switching element. In other words, the ratio of the input voltage Vin to the output voltage Vout (input-output conversion ratio) is determined by the switching operation of the switching element. The output voltage Vout is detected and the switching operation of the switching element is controlled on the basis of the detected voltage so that the output voltage Vout can be regulated to a preset voltage. Recently, an increasing number of DC-DC converters using a synchronous rectifier as a rectifier in the rectifying/smoothing circuit to reduce the conduction loss have been used.

Due to a sudden increase in the input voltage Vin or a decrease in the current flowing in the load, a voltage (overshoot voltage) that is greater than the output voltage Vout, which is supplied from the DC-DC converter to the load, may be applied at the output side of the DC-DC converter.

In such a case, due to the application of the overshoot voltage, a smoothing capacitor of the rectifying/smoothing circuit is charged by the overshoot voltage. Subsequently, when the application of overshoot voltage is removed, the voltage at the output side of the DC-DC converter returns to a steady voltage. At this moment, the charge in the charged smoothing capacitor is released. In response to the application of the overshoot voltage, the switching operation of the switching element is controlled to reduce the output voltage Vout. As a result, a voltage obtained by multiplying the input voltage Vin by the input-output conversion ratio becomes smaller than the voltage across the smoothing capacitor. Thus, the charge released by the smoothing capacitor flows toward the input side of the DC-DC converter, thus generating a reverse current flowing from the output side to the input side of the DC-DC converter.

The amount of reverse current flowing becomes very large even when the overshoot voltage is only slightly higher than the steady output voltage Vout. Many problems may occur due to this large reverse current flowing.

Such a large amount of reverse current flows because the DC-DC converter with the known synchronous rectifier has regulation characteristics such as those shown in FIG. 12A. Specifically, the known DC-DC converter for rectifying/smoothing a current by the synchronous rectifier and for outputting a DC output voltage Vout has, as shown in FIG. 12A, regulation characteristics in which the amount of change in the output voltage Vout in the increasing direction (slope) is gradual compared with the amount of change in the output current in the decreasing direction, even in a reverse current flowing region. In a region where the output current shown in FIG. 12A is positive (+), the output current flows from the input side to the output side of the DC-DC converter. A region where the output current is negative (−) is the reverse current flowing region in which the reverse current flows from the output side to the input side of the DC-DC converter.

Since the known DC-DC converter has regulation characteristics such as those shown in FIG. 12A, for example, the application of an overshoot voltage Vx, which is very slight, at the output side of the DC-DC converter causes a high reverse current Ix to flow through the DC-DC converter.

Since this high reverse current flows, a high stress is placed on the components of the DC-DC converter, and the components may be damaged. In a DC-DC converter including a transformer, a rectifying/smoothing choke coil, and a synchronous rectifier, a large amount of electromagnetic energy generated by the reverse current flowing in a period during which the switching element is ON is accumulated in the choke coil and the transformer. When the switching element is turned OFF, a large voltage due to the accumulated energy is applied to the switching element and the rectifying/smoothing synchronous rectifier, and the switching element and the synchronous rectifier may be damaged. The components of the DC-DC converter may be damaged by the reverse current flowing.

FIG. 11 shows a parallel running configuration including a plurality of DC-DC converters (two in FIG. 11, namely, DC-DC converters A and B) connected in parallel to a load. When such parallel running is performed, the parallel-connected DC-DC converters A and B may have different output voltages Vout. In such a case, a reverse current flows from the DC-DC converter A that has a higher output voltage Vout toward the DC-DC converter B that has a lower output voltage Vout. Due to the reverse current, a circulating current is generated between the DC-DC converters A and B.

For example, the DC-DC converter A that has the higher output voltage Vout has regulation characteristics indicated by the solid line A in FIG. 12B, and the DC-DC converter B that has the lower output voltage Vout has regulation characteristics indicated by the solid line B in FIG. 12B. The parallel-running DC-DC converters A and B, as a whole, supply a current Ic to the load. In this case, a reverse current Ib based on the output voltage Vout of the DC-DC converter A flows from the DC-DC converter A to the DC-DC converter B having the lower output voltage Vout. Due to this reverse current flowing, the DC-DC converter B has a loss Ib.

In contrast, the DC-DC converter A is required to output a current Ia (Ia=Ib+Ic) in order to compensate for the loss Ib due to the reverse current flowing relative to the amount of current supplied to the load Ic. As a result, the amount of current flowing in the DC-DC converter A is increased, and the loss is increased. As described above, when parallel running is performed, if the parallel connected DC-DC converters A and B have different output values Vout, the DC-DC converter A having the higher output voltage and the DC-DC converter B having the lower output voltage both have an increased amount of loss. As a result, the circuit efficiency is deteriorated.

SUMMARY OF THE INVENTION

In order to overcome the problems described above, preferred embodiments of the present invention provide a DC-DC converter which has a synchronous rectifier and which is capable of minimizing the amount of reverse current flowing, preventing the components from being damaged by the reverse current flowing, and preventing an increase in loss due to the reverse current flowing while parallel running is performed.

According to a preferred embodiment of the present invention, a DC-DC converter for converting an input voltage at an input-output conversion ratio and for outputting the converted voltage to a load includes a switching element, the input voltage being converted in response to the switching operation of the switching element, and the input-output conversion ratio being determined by the switching operation of the switching element, a choke coil through which the converted voltage is applied to the load, a synchronous rectifier, a reverse current detector for detecting a reverse current flowing from the output side to the input side of the DC-DC converter, and a reverse current suppressor for suppressing the amount of reverse current flowing when a reverse current is detected. The choke coil has a function of increasing the inductance when the current is within a current operating range that is less than or equal to a predetermined value and decreasing the inductance when the current is in a current operating range that exceeds the predetermined value.

The reverse current detector may include a unit for detecting a control terminal (gate or base) voltage of the switching element, and a unit for directly or indirectly detecting, from the output voltage of a transformer, the voltage across the switching element (drain-to-source or collector-to-emitter). In a case in which the control terminal voltage of the switching element is at a level at which the switching element is turned off and the voltage across the switching element is low, it may be determined that the case corresponds to a reverse current state.

The choke coil may include a core which easily becomes locally magnetically saturated at one place in a magnetic path, and the choke coil may have swinging characteristics in which the inductance decreases when the amount of current flowing through the choke coil becomes a predetermined value or greater, thus causing local magnetic saturation in the core.

The choke coil may be constructed by serially connecting an inductor which has a small inductance and which is difficult to magnetically saturate and an inductor which has a large inductance and which is easily and magnetically saturable.

The reverse current suppressor may suppress the amount of reverse current flowing by controlling the input-output conversion ratio, which is determined by the switching operation of the switching element, in the increasing direction when a reverse current is detected.

The reverse current suppressor may turn off the synchronous rectifier or may bring forward the time at which the synchronous rectifier is turned off when a reverse current is detected.

According to another preferred embodiment of the present invention, a DC-DC converter for converting an input voltage at an input-output conversion ratio and for outputting the converted voltage to a load includes a switching element, the input voltage being converted in response to the switching operation of the switching element, and the input-output conversion ratio being determined by the switching operation of the switching element, an inductance element through which the converted voltage is applied to the load, a synchronous rectifier, a reverse current detector for detecting a reverse current flowing from the output side to the input side of the DC-DC converter, and a reverse current suppressor for suppressing the amount of reverse current flowing when a reverse current is detected. The reverse current suppressor includes a unit for turning off the synchronous rectifier or bringing forward the time at which the synchronous rectifier is turned off when a reverse current is detected.

The reverse current detector may include a unit for detecting a control terminal (gate or base) voltage of the switching element, and a unit for directly or indirectly detecting, from the output voltage of a transformer, the voltage across the switching element (drain-to-source or collector-to-emitter). In a case in which the control terminal voltage of the switching element is at a level at which the switching element is turned off and the voltage across the switching element is low, it may be determined that the case corresponds to a reverse current state.

According to preferred embodiments of the present invention, when the reverse current detector detects a reverse current, the reverse current suppressor controls the input-output conversion ratio, which is determined by the switching operation of the switching element, in the increasing direction, turns off the synchronous rectifier, or brings forward the time at which the synchronous rectifier is turned off.

Since the input-output conversion ratio, which is determined by the switching operation of the switching element, is controlled by the reverse current suppressor in the increasing direction, the DC-DC converter of preferred embodiments of the present invention has regulation characteristics in which the amount of change in the output voltage in the increasing direction is sudden, compared with before, relative to the amount of change in the reverse current in the increasing direction in a reverse current flowing region. In particular, by exerting the function of increasing the inductance in a current operating range in which the current in the inductance element (choke coil) is less than or equal to a predetermined value, the amount of reverse current flowing can be further minimized. Thus, for example, when an overshoot voltage is applied at the output side of the DC-DC converter, a stress placed on the components of the DC-DC converter can be greatly reduced compared with before.

Accordingly, the components are substantially protected from damage by the reverse current flowing, and the durability and reliability of the DC-DC converter are greatly improved. When parallel running is performed, if a plurality of DC-DC converters connected in parallel to each other have different output voltages, the amount of reverse current flowing due to the differences in the output voltages can be minimized. It is thus possible to absorb the increase in loss of the DC-DC converter caused by the reverse current flowing, and deterioration of circuit efficiency can be prevented.

When a reverse current is detected, the reverse current suppressor turns off the synchronous rectifier or brings forward the time at which the synchronous rectifier is turned off. In this case, the flow of reverse current can be reliably cut off by performing off operation of the synchronous rectifier.

Other features, elements, characteristics and advantages of the present invention will become more apparent from the following detailed description of preferred embodiments thereof with reference to the attached drawings.

BRIEF DESCRIPTION OF THE DRAWINGS

FIG. 6 includes waveform charts showing waveforms of voltages and currents flowing in the main circuit components of the DC-DC converter shown in FIG. 1 when a reverse current does not flow;

DETAILED DESCRIPTION OF PREFERRED EMBODIMENTS

The present invention will become clear from the following description of preferred embodiments thereof with reference to the accompanying drawings.

Figure 5A:
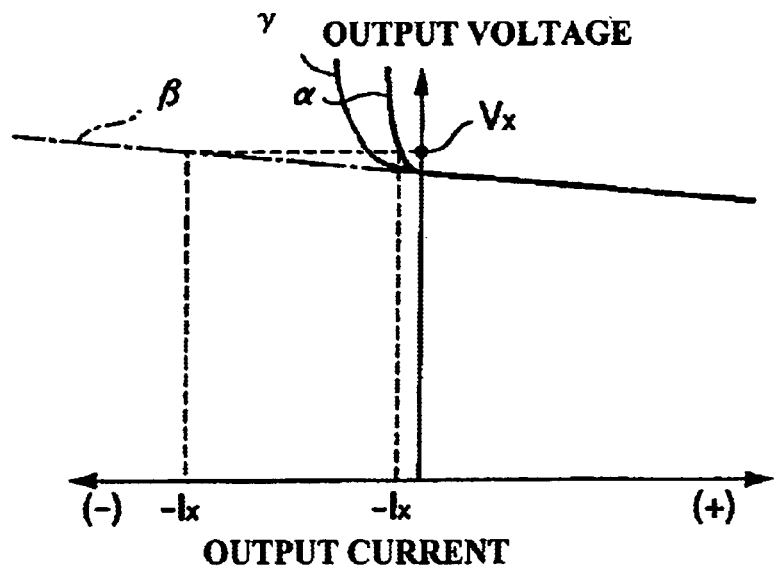
FIGS. 5A and 5B are graphs showing unique regulation characteristics achieved by various unique features of preferred embodiments of the present invention.

The inventors of the present invention have made efforts to suppress the amount of reverse current flowing by creating the circuitry of a DC-DC converter so that the DC-DC converter can have regulation characteristics such as those indicated by the solid line α in FIG. 5A. Specifically, the regulation characteristics α are such that, in a reverse current flowing region where the output current is negative (−), the amount of change in the output voltage Vout in the increasing direction suddenly increases relative to the amount of change in the reverse current in the increasing direction.

With the regulation characteristics α, for example, if an overshoot voltage Vx is applied at the output side of the DC-DC converter, a reverse current Ix flows in the DC-DC converter. In contrast, when the DC-DC converter has known regulation characteristics β such as those indicated by the dotted line β in FIG. 5A, if the same overshoot voltage Vx is applied at the output side of the DC-DC converter, a reverse current Ix much greater than the above current Ix flows in the DC-DC converter.

When the DC-DC converter has the regulation characteristics α, the amount of reverse current flowing in the DC-DC converter is greatly suppressed compared with before. As a result, various problems caused by a high reverse current flowing are prevented.

The inventors of the present invention have succeeded in developing the circuitry for allowing the DC-DC converter to exhibit the unique regulation characteristics α. The specific circuit configuration will now be described.

Figure 1:
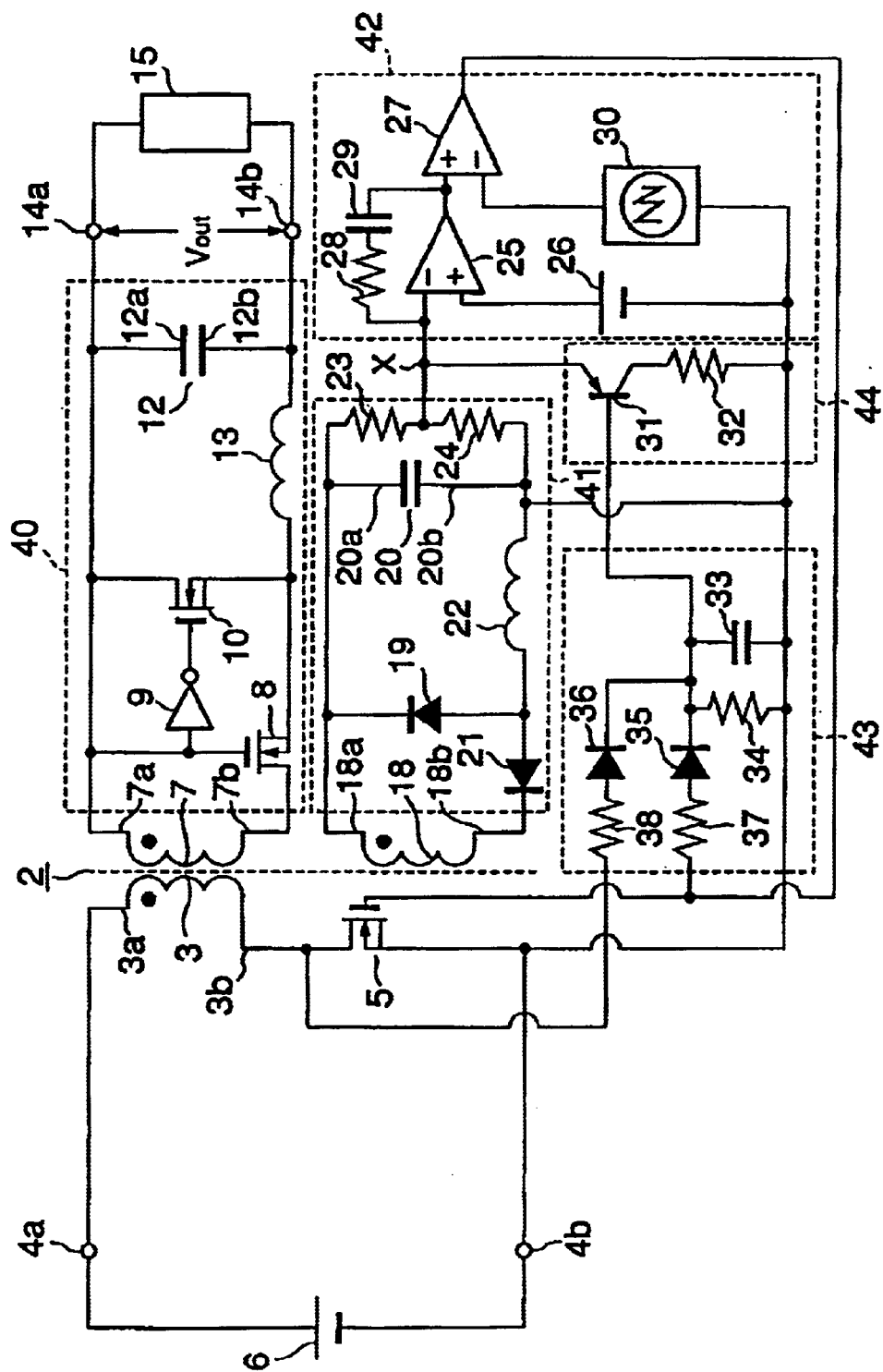
FIG. 1 is a circuit diagram showing the configuration of a DC-DC converter according to a first preferred embodiment of the present invention.
Figure 2A:
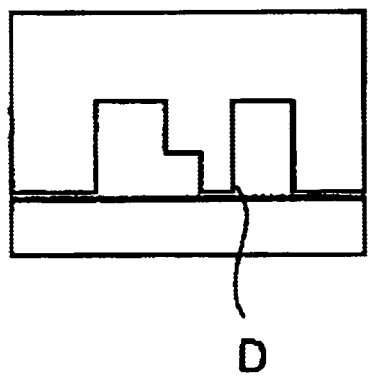
FIGS. 2A to 2E illustrate examples of the shapes of a core in a choke coil having a variable inductance depending on the amount of current flowing.
Figure 2B:
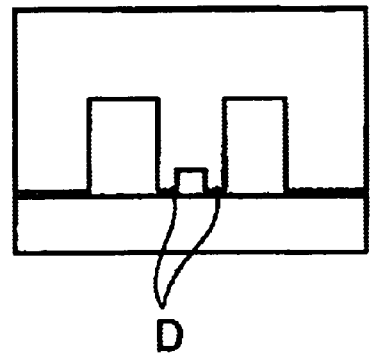
Figure 2C:
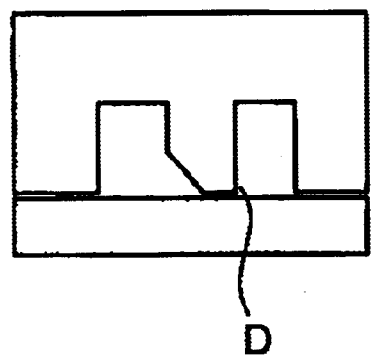
Figure 2D:
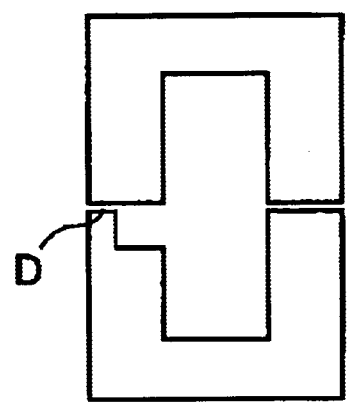
Figure 2E:
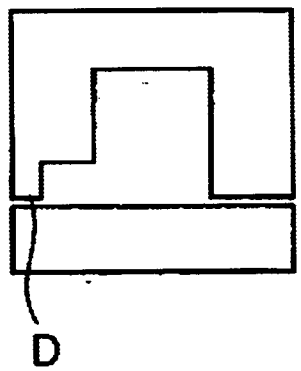

FIG. 1 shows a DC-DC converter with a synchronous rectifier, the DC-DC converter having the unique regulation characteristics α, according to a first preferred embodiment of the present invention. A DC-DC converter 1 shown in FIG. 1 is an insulated-type forward converter and includes a transformer 2. In the transformer 2, a primary coil 3 has a first end 3a connected to an input-side connection portion 4a and a second end 3b connected to the drain of a switching element 5 defined by a MOS-FET. The source of the switching element 5 is connected to an input-side connection portion 4b. By connecting the input-side connection portion 4a to the positive polarity side of a DC input power supply 6 and the input-side connection portion 4b to the negative polarity side of the input power supply 6, the primary side of the transformer 2 is connected to the input power supply 6.

In the transformer 2, a secondary coil 7 has a first end 7a connected to the gate of a rectification-side synchronous rectifier 8 defined by a MOS-FET, the input side of an inverter 9, the drain of a commutation-side synchronous rectifier 10 defined by a MOS-FET, and a first end 12 of a smoothing capacitor 12.

The secondary coil 7 has a second end 7b connected to the drain of the rectification-side synchronous rectifier 8. The source of the rectification-side synchronous rectifier 8 is connected to the source of the commutation-side synchronous rectifier 10. The gate of the commutation-side synchronous rectifier 10 is connected to the output side of the inverter 9. A choke coil 13 functioning as an inductance element has a first end connected to the node between the source of the rectification-side synchronous rectifier 8 and the source of the commutation-side synchronous rectifier 1 and a second end connected to a second end 12b of the smoothing capacitor 12.

A load 15 is connected in parallel to the smoothing capacitor 12 via output-side connection portions 14a and 14b.

The transformer 2 has a tertiary coil 18. The tertiary coil 18 has a first end 18a connected to the cathode of a diode 19 and a first end 20a of a capacitor 20. The tertiary coil 18 has a second end 18b connected to the cathode of a diode 21. The anode of the diode 21 is connected to the anode of the diode 19 and a first end of a choke coil 22. A second end of the choke coil 22 is connected to a second end 20b of the capacitor 20. A series connection of resistors 23 and 24 is connected in parallel to the capacitor 20.

An inverting input terminal (−) of an operational amplifier 25 is connected to the node between the resistors 23 and 24. A non-inverting input terminal (+) of the operational terminal 25 is connected to the positive polarity side of a reference power supply 26. The output side of the operational amplifier 25 is connected to a non-inverting input terminal (+) of a comparator 27. The circuit between the non-inverting input terminal and the output side of the operational amplifier 25 is short circuited by phase-correcting series connection of a resistor 28 and a capacitor 29.

An inverting input terminal (−) of the comparator 27 is connected to the output side of a triangular wave oscillator 30. The output side of the comparator 27 is connected to the gate of the switching element 5.

The emitter of a PNP transistor 31 is connected to a node X between the node between the resistors 23 and 24 and the inverting input terminal of the operational amplifier 25. The collector of the PNP transistor 31 is connected to a first end of a resistor 32. A second end of the resistor 32 is connected to ground.

The base of the PNP transistor 31 is connected to a first end of a capacitor 33, a first end of a resistor 34, the cathode of a diode 35, and the cathode of a diode 36. A second end of the capacitor 33 and a second end of the resistor 34 are grounded.

The anode of the diode 35 is connected to a first end of a resistor 37. A second end of the resistor 37 is connected to the gate of the switching element 5. The anode of the diode 36 is connected to a first end of the resistor 38. A second end of the resistor 38 is grounded to the drain of the switching element 5.

A rectifying/smoothing circuit 40 is defined by the rectification-side synchronous rectifier 8, the inverter 9, the commutation-side synchronous rectifier 10, the smoothing capacitor 12, and the choke coil 13. The rectifying/smoothing circuit 40 rectifies/smoothes an AC voltage output from the secondary coil 7 of the transformer 2 and supplies a DC output voltage Vout to the load 15.

An output voltage detecting circuit 41 for detecting the output voltage Vout is defined by the diodes 21 and 19, the capacitor 20, and the choke coil 22. The energy output from the tertiary coil 18 corresponds to the output voltage Vout output from the DC-DC converter to the load 15. Utilizing this fact, the output voltage detecting circuit 41 rectifies/smoothes an AC voltage output from the tertiary coil 18, divides the resulting voltage using the resistors 23 and 24, and outputs the divided voltage as a detected voltage of the output voltage Vout.

A control circuit (PWM (pulse width modulation) control circuit) 42 includes the operational amplifier 25, the reference power supply 26, the comparator 27, the resistor 28, the capacitor 28, and the triangular wave oscillator 30. The control circuit 42 controls the switching operation of the switching element 5 on the basis of the detected voltage of the output voltage Vout, which is output from the output voltage detecting circuit 41, so that the output voltage Vout can be regulated to a preset value. In the first preferred embodiment, the control circuit 42 supplies a pulse-shaped signal, which is a control voltage shown in FIG. 6(b), from the output side of the comparator 27 to the gate (which is a control terminal) of the switching element 5. The control circuit 42 variably controls the pulse width t of the pulse-shaped signal so that the output voltage Vout can be regulated and hence variably controls an ON period during which the switching element 5 is turned ON. In other words, the control circuit 42 variably controls the duty ratio of the switching element 5 (the ratio of the ON period t to one ON/OFF period T (t/T)) so that the output voltage Vout can be regulated. Accordingly, the output voltage Vout can be variably controlled, and hence the output voltage Vout can be regulated.

A reverse current detector 43 includes the capacitor 33, the resistors 34, 37, and 38, and the diodes 35 and 36. A reverse current suppressor 44 includes the PNP transistor 31 and the resistor 36.

FIG. 6 shows examples of waveforms of currents and voltages in the main components of the DC-DC converter when no reverse current flows. FIG. 7 shows examples of waveforms of currents and voltages in the main components when a reverse current flows. As shown in FIGS. 6(a) and 6(b), when no reverse current flows, the gate voltage of the switching element 5 becomes a voltage that is less than a preset ON-drive threshold voltage. At the moment that the switching element 5 is turned OFF, the drain voltage of the switching element 5, that is, the drain-to-source voltage (voltage across the current input and output ends of the switching element 5) suddenly increases from zero to a voltage Vs or greater based on an input voltage Vin of the input power supply 6.

Figure 7A:
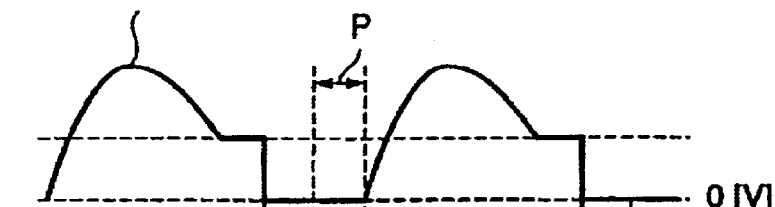
FIG. 7 includes waveform charts showing waveforms of voltages and currents flowing in the main circuit components of the DC-DC converter shown in FIG. 1 when a reverse current flows.
Figure 7B:
Figure 7C:
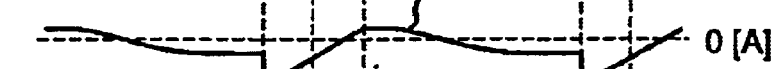
Figure 7D:
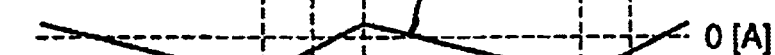
Figure 7E:
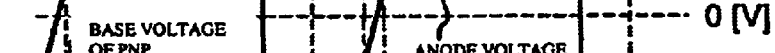

In contrast, as shown in FIGS. 7(a) and (b), when a reverse current flows, even if the switching element 5 is turned OFF, the drain voltage of the switching element 5 remains unchanged as a low voltage (zero volts in the first preferred embodiment) for a period P due to the reverse current flowing. This phenomenon occurs because the energy accumulated in the choke coil 13 of the rectifying/smoothing circuit 40 is transferred, due to the reverse current flowing, from the secondary side to the primary side of the transformer 2 when the switching element 5 is turned OFF. This phenomenon is unique to a period during which the reverse current flows.

In view of this unique phenomenon that occurs due to the reverse current flowing, the inventors of the present invention have formed the reverse current detector 43 for detecting a reverse current if the gate voltage of the switching element 5 is less than the preset ON-drive threshold voltage and if the drain voltage (end-to-end voltage) of the switching element 5 is low (zero volts in the first preferred embodiment) due to a reverse current.

In other words, the reverse current detector 43 preferably includes a gate voltage detector, which is a control voltage detector including the diode 35 and the resistor 37, a drain-to-source voltage detector (drain voltage detector), which is an end-to-end voltage detector including the diode 36 and the resistor 38, and a reverse current detection signal output unit including the capacitor 33 and the resistor 34, which outputs a reverse current detection signal if the gate voltage of the switching element 5 is less than the preset ON-drive threshold voltage and if the drain voltage (end-to-end voltage) of the switching element 5 is low.

Figure 4:
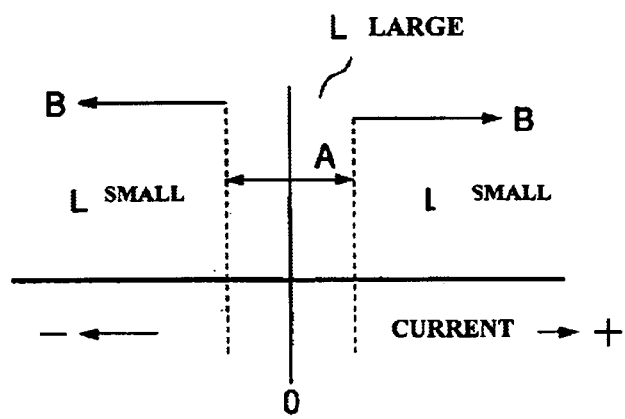
FIG. 4 illustrates the relationship between current operating ranges and the inductance (large and small) of the choke coil.

The feature of the first preferred embodiment is that the choke coil 13 is configured to have a variable inductance depending on the magnitude of the current flowing. Specifically, as shown in FIG. 4, the choke coil 13 has a function of changing the inductance L to a small value in current operating ranges (ranges B) in a normal operation mode and changing the inductance L to a large value in a current operating range (range A) in which the current is smaller than that in the normal operation mode.

The choke coil 13 with such a function is generally referred to as a swinging choke coil or a swaying choke coil. FIGS. 2A to 2E show examples of a core of the choke coil 13 with this function. As shown in FIGS. 2A to 2E, a portion D with a small cross-sectional area is created at least at one place in a magnetic path of the core. As a result, when the amount of current flowing is small, the inductance becomes high, and, when the amount of current flowing is large, the inductance becomes small. Thus, the choke coil 13 has a function of changing the inductance.

The DC-DC converter of the first preferred embodiment is arranged as described above. Hereinafter the circuit operation of the DC-DC converter of the first preferred embodiment for detecting and suppressing a reverse current will now be briefly described.

The diode 35 and the resistor 37 of the reverse current detector 43 detect the gate voltage of the switching element 5. The diode 36 and the resistor 38 detect the drain voltage (drain-to-source voltage) of the switching element 5. The detected gate voltage and the drain voltage are applied to the capacitor 33 and the resistor 34, respectively. The capacitor 33 and the resistor 34 apply voltages, such as those shown in FIG. 6(f) and FIG. 7(f), based on the voltages applied thereto to the base of the PNP transistor 31 of the reverse current suppressor 44.

Figure 7F:
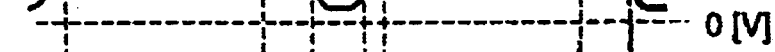
Figure 7G:
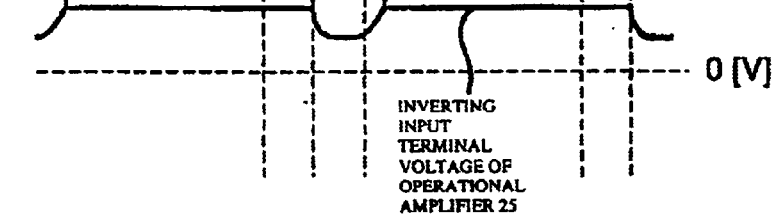
Figure 8:
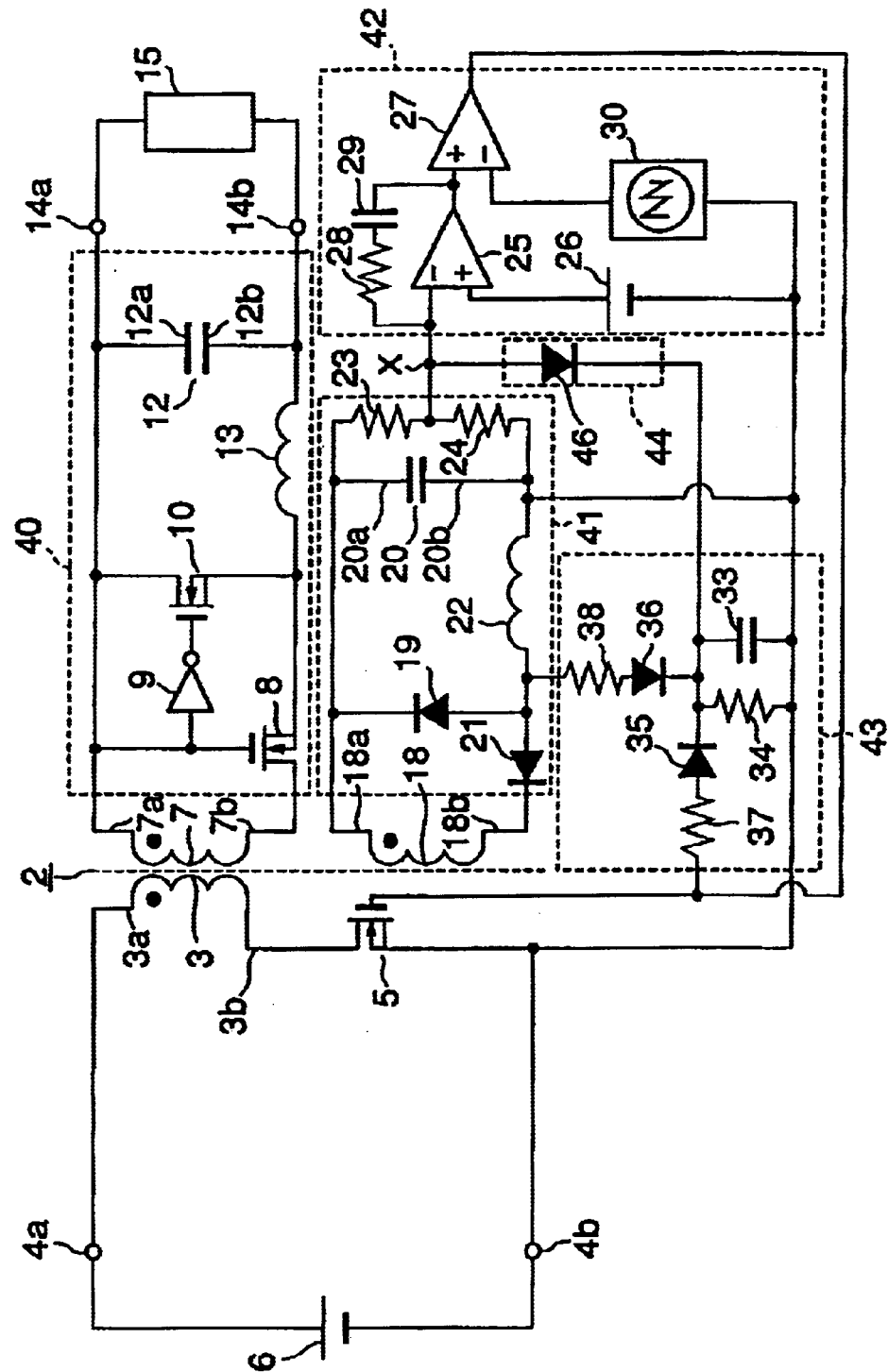
FIG. 8 is a circuit diagram showing the configuration of a DC-DC converter according to a second preferred embodiment of the present invention.

In a case in which the gate voltage is less than the preset ON-drive threshold voltage and the drain voltage of the switching element 5 is low due to the reverse current, the voltages output from the capacitor 33 and the resistor 34 to the base of the PNP transistor 31 are reduced, as shown in FIG. 7(f), compared with the other cases. In the first preferred embodiment, the circuit constant is preset so that the reduced base voltage of the PNP transistor 31 can be a signal at the preset ON-drive voltage level. In other words, when a reverse current is generated, the capacitor 33 and the resistor 34 output a signal at the ON-drive voltage level (for turning ON the PNP transistor 31) to the base of the PNP transistor 31 as a reverse current detection signal.

The PNP transistor 31 receives the reverse current detection signal and is turned ON. As a result, a portion of a current flowing from the node between the resistors 23 and 24 to the inverting input terminal of the operational amplifier 25 passes through the node X, the PNP transistor 31, and the resistor 32, and hence the current is divided. When a reverse current flows, although a voltage output from the node between the resistors 23 and 24 is increased compared with a steady state due to the application of an overshoot voltage, a voltage input to the inverting input terminal of the operational amplifier 25 is reduced compared with the steady state. As a result of the voltage reduction, the pulse width t of a pulse-shaped signal supplied from the control circuit 42 to the gate of the switching element 5 is increased, and the ON-period during which the switching element 5 is turned ON is increased. Thus, the input-output conversion ratio is increased, and hence the output voltage Vout is increased.

According to the first preferred embodiment, the DC-DC converter can have regulation characteristics γ, indicated by the solid line γ in FIG. 5A, by providing the reverse current detector 43 and the reverse current suppressor 44 to increase the input-output conversion ratio when a reverse current flows. In addition, according to the first preferred embodiment, as described above, since the choke coil 13 begins to have an increased inductance when a small reverse current starts flowing, the DC-DC converter exhibits the regulation characteristics α shown in FIG. 5A, in which the amount of change in voltage suddenly increases relative to the amount of change in current. If a reverse current is generated, the amount of reverse current flowing can be greatly suppressed compared with before.

Since the amount of reverse current flowing can be greatly suppressed, the components can be reliably protected from being damaged by a high reverse current flowing. If a relatively high overshoot voltage is generated at the output side of the DC-DC converter, with the regulation characteristics α showing a sudden change in FIG. 5A, the amount of reverse current can be reduced to a small value. As a result, the circuit loss due to the reverse current can be minimized.

When parallel running is performed using DC-DC converters of the first preferred embodiment, if a plurality of DC-DC converters connected in parallel have different output voltages Vout, it is possible to absorb the increase in loss caused by the reverse current flowing due to the differences in the output voltages Vout. Thus, deterioration of circuit efficiency can be prevented.

Figure 5B:
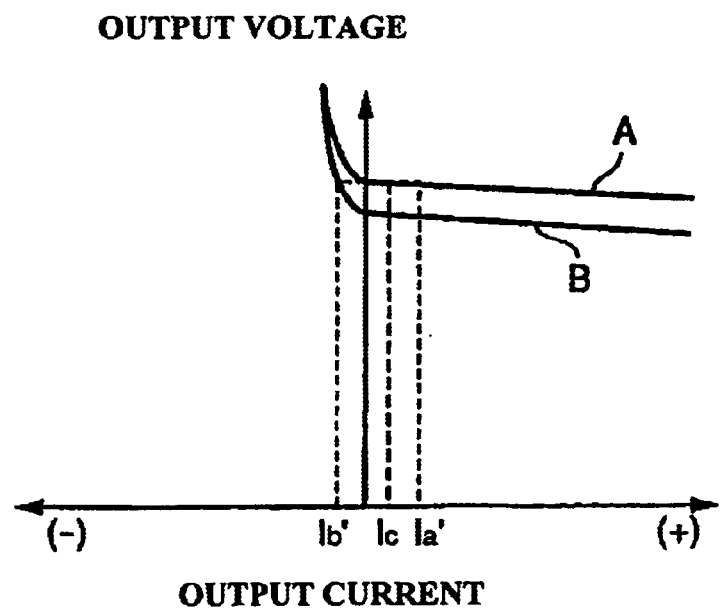
Figure 11:
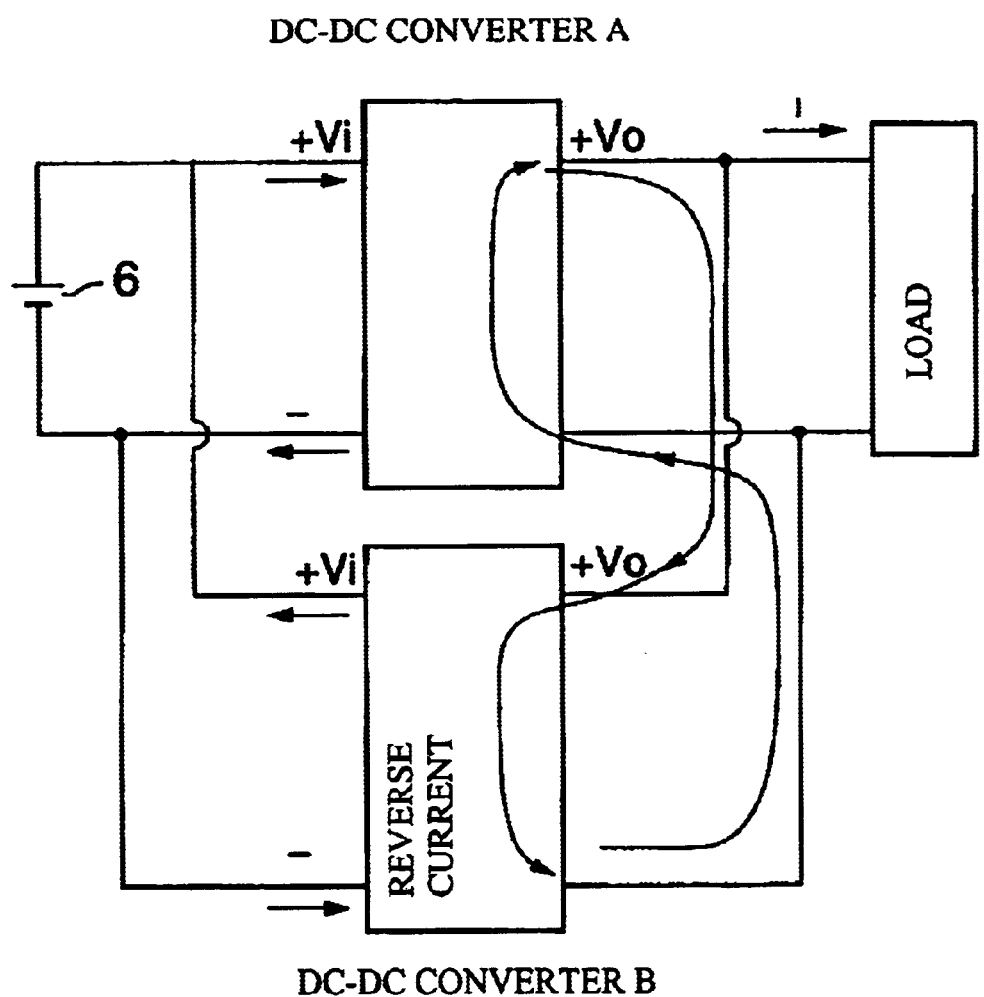
FIG. 11 illustrates parallel running of DC-DC converters.
Figure 12A:
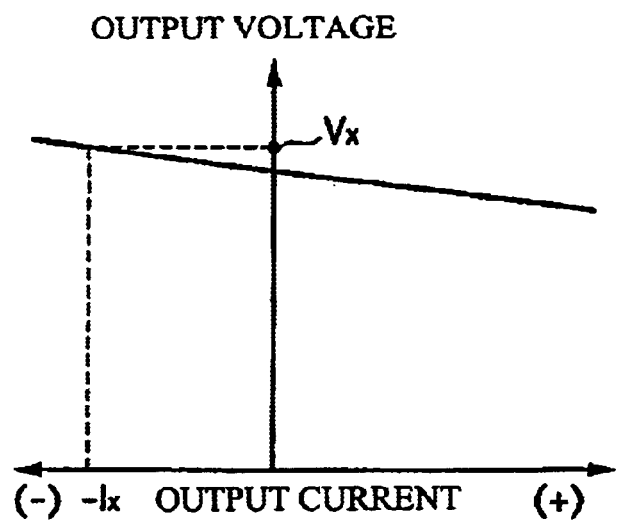
FIGS. 12A and 12B are graphs showing regulation characteristics of a DC-DC converter with a known synchronous rectifier.
Figure 12B:
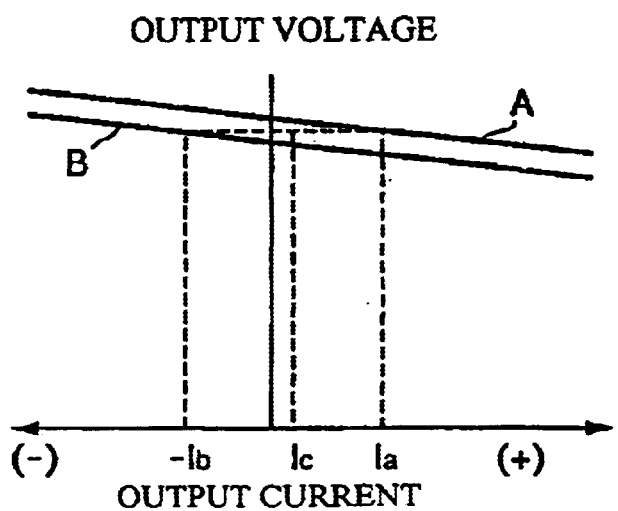

More specifically, FIG. 11 shows the parallel running configuration using DC-DC converters A and B. Of the DC-DC converters A and B, the DC-DC converter A having a higher output voltage Vout has regulation characteristics indicated by the solid line A in FIG. 5B, and the DC-DC converter B having a lower output voltage Vout has regulation characteristics indicated by the solid line B in FIG. 5B. The amount of reverse current flowing from the DC-DC converter A to the DC-DC converter B is Ib', which is much smaller than a reverse current Ib shown in FIG. 12B showing known regular characteristics. Accordingly, the loss of DC-DC converter B due to the reverse current flowing (circulation of reverse current) can be minimized.

Also, the amount of current flowing to the DC-DC converter A is reduced due to a decrease in the amount of reverse current flowing to the DC-DC converter B. Thus, the loss of the DC-DC converter A can also be minimized.

Because the amount of reverse current flowing is greatly suppressed, it is possible to greatly absorb an increase in loss due to the reverse current flowing when parallel running is performed. Thus, deterioration of circuit efficiency is reliably prevented.

Figure 3A:
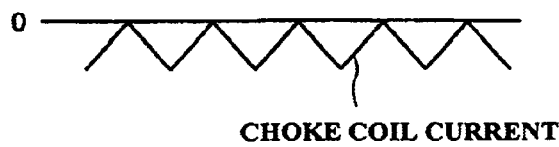
FIGS. 3A to 3C illustrate examples of current flowing through the choke coil in the DC-DC converter.
Figure 3B:
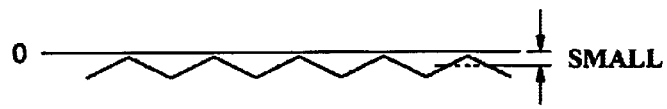
Figure 3C:

Referring to FIGS. 3A to 3C, the above-described reverse current preventing circuit, namely, the reverse current detector 43 and the reverse current suppressor 44, is activated in an operating state (critical point operation) shown in FIG. 3A in which the peak of a triangular wave current flowing through the choke coil 13 of the DC-DC converter is in contact with the line of zero amperes. The larger the inductance of a choke coil, the smaller the amount of reverse current in the critical point operation. It is thus desirable that the inductance of the choke coil be large in a region where the reverse current preventing circuit is operated.

If a large current flows and saturates in a normal operation mode, a surge voltage is generated at a switching element, and an output ripple voltage is increased. Thus, the optimal circuit operation cannot be achieved. In the first preferred embodiment, as shown in FIG. 3C, the inductance is reduced when a relatively large current flows through the choke coil 13 in the normal operation mode (that is, when the absolute value of current is large). Accordingly, the satisfactory circuit operation in which current saturation hardly occurs can be achieved.

A second preferred embodiment will now be described.

In the second preferred embodiment, the first end of the resistor 38 of the reverse current detector 43 is connected, not to the drain of the switching element 5 in the first preferred embodiment, but to the node between the anodes of the diodes 19 and 21 of the output voltage detecting circuit 41.

In the second preferred embodiment, the reverse current suppressor 44 preferably includes a diode 46, instead of the PNP transistor 31 and the resistor 32 as in the first preferred embodiment. The anode of the diode 46 is connected to the node X between the node of the resistors 23 and 24 and the inverting input terminal of the operational amplifier 25. The cathode of the diode 46 is connected to the output side of the reverse current suppressor 44 (the capacitor 33 and the resistor 34).

The configuration of the second preferred embodiment other than the foregoing differences is similar to that of the first preferred embodiment. In a description of the second preferred embodiment, the same reference numerals are given to the same components as those in the first preferred embodiment, and repeated descriptions of the common portions are omitted.

As shown in FIGS. 6(a) and (e) and in FIGS. 7(a) and (e), when the drain voltage of the switching element 5 is low due to the reverse current flowing, the voltages at the anodes of the diodes 19 and 21 in the output voltage detecting circuit 41 are negative voltages. In other cases, these voltages are positive voltages. In the second preferred embodiment, in view of this phenomenon, instead of directly detecting the low voltage state of the drain voltage (end-to-end voltage) of the switching element 5 in the first preferred embodiment, the following operation is performed. Specifically, the voltages at the anodes of the diodes 19 and 21 are detected by the diode 36 and the resistor 38. A voltage waveform similar to that of the drain voltage of the switching element 5, which is output from the tertiary coil 18 of the transformer 2, is rectified by the diodes 19 and 21, and the rectified voltage waveform is detected. Thus, he low voltage state of the drain voltage (end-to-end voltage) of the switching element 5 can be indirectly detected.

In the second preferred embodiment, in a case in which the gate voltage of the switching element 5 is less than the preset ON-drive threshold voltage and the drain voltage of the switching element 5 is low (that is, the voltage at the node between the anodes of the diodes 19 and 21 is negative) due to a reverse current flowing, the reverse current detector 43 reduces the voltage at the cathode of the diode 46 of the reverse current suppressor 44 so that the voltage applied to the diode 46 can be the ON-drive voltage or greater.

When a reverse current flows, the diode 46 is turned ON, and, as in the first preferred embodiment, a portion of the current flowing from the node between the resistors 23 and 24 to the operational amplifier 25 is divided at the node X toward the diode 46, and the voltage input to the inverting input terminal of the operational amplifier 25 is reduced. As a result, the pulse width t of the pulse-shaped signal supplied from the control circuit 42 to the switching element 5 is increased, and the input-output conversion ratio is increased. Accordingly, the output voltage Vout is increased.

In the second preferred embodiment, as in the first preferred embodiment, the reverse current detector 43 and the reverse current suppressor 44 are provided to increase the input-output conversion ratio when a reverse current flows. By using the choke coil 13 with a variable inductance depending on the amount of current flowing, the DC-DC converter can have the unique regulation characteristics α shown in FIG. 5A. Accordingly, the amount of reverse current flowing is greatly reduced, and various problems caused by the reverse current flowing can be prevented.

A third preferred embodiment according to the present invention will now be described. One of the unique features of the third preferred embodiment is that the choke coil 13 as an inductance element is replaced by a series circuit including an inductor having a large inductance and an inductor having a small inductance. The other components of the third preferred embodiment are preferably the same as those in the first and second preferred embodiments. The inductor having a large inductance has saturable characteristics, whereas the inductor having a low inductance has difficult-to-saturate characteristics.

The saturable inductor (having a large inductance) and the difficult-to-saturate inductor (having a small inductance) can be formed by various methods. For example, the saturable inductor and the difficult-to-saturate inductor can be produced by selecting a saturable core material and a difficult-to-saturate core material. When the same core is used, with a small number of windings in a large gap in the coil, the inductance is reduced, and hence a difficult-to-saturate inductor can be achieved. In contrast, with a large number of windings in a small gap in the coil, the inductance is increased, and a saturable inductor can be achieved.

A difficult-to-saturate inductor can be produced by using a material having a high saturation magnetic flux density. In contrast, a saturable inductor can be produced by using a material with a low saturation magnetic flux density. Also, a difficult-to-saturate inductor and a saturable inductor can be produced by using cores having different shapes.

In the third preferred embodiment, when a small reverse current flows, the inductor having a large inductance (saturable inductor) secures the regulation characteristics α in FIG. 5A, and an increase in the reverse current is prevented. When a relatively large current flows in the normal operation mode, the inductor having a large inductance (saturable inductor) saturates. On the other hand, the inductor having a small inductance (difficult-to-saturate inductor) does not saturate, and the favorable circuit operation is maintained. Accordingly, advantages similar to those in the first and second preferred embodiments can be achieved.

Figure 9:
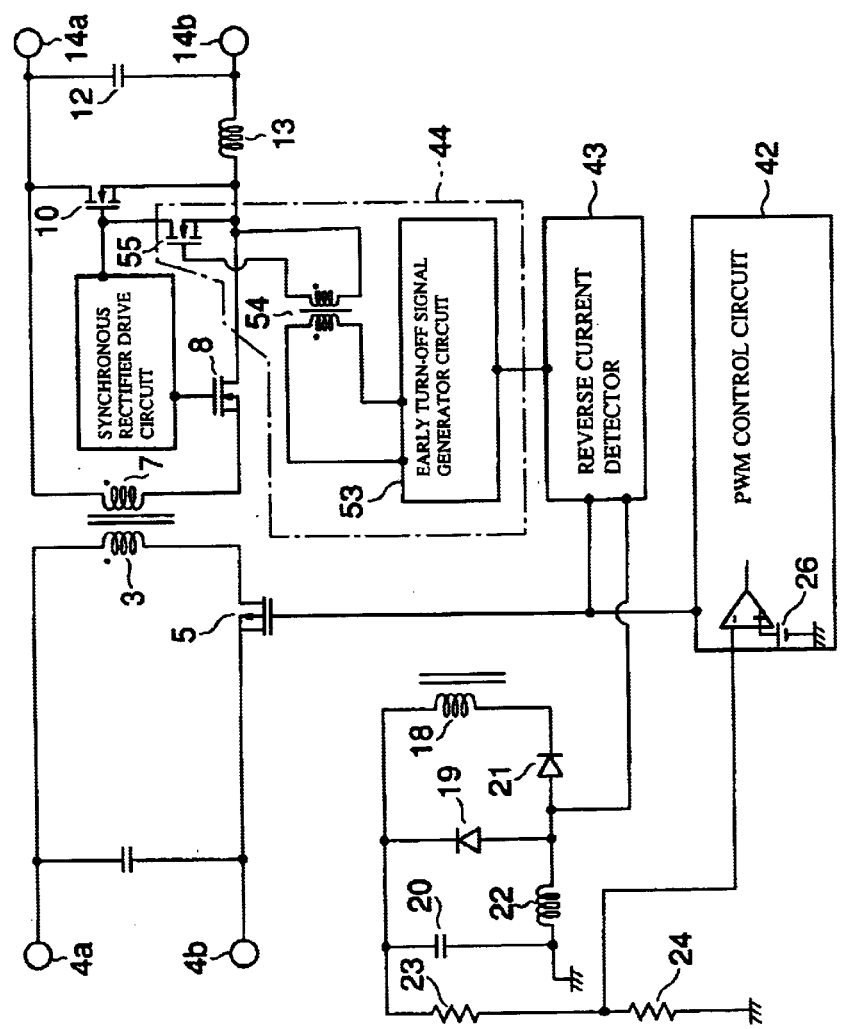
FIG. 9 is a circuit diagram showing the configuration of a DC-DC converter according to a fourth preferred embodiment of the present invention.

A fourth preferred embodiment according to the present invention will now be described. FIG. 9 shows the main circuit configuration of a DC-DC converter of the fourth preferred embodiment. One of the unique features of the fourth preferred embodiment is that the reverse current suppressor 44 is designed to turn off the synchronous rectifier (commutation-side synchronous rectifier 10) when a reverse current is detected. More specifically, referring to FIG. 9, the reverse current suppressor 44 includes an early turn-off signal generator circuit 53, a drive transformer 54, and a switching element 55.

In this example, the switching element 55 is defined by a MOS-FET The gate of the MOS-FET is connected to the output end of the drive transformer 54, the drain is connected to the gate of the commutation-side synchronous rectifier 10, and the source is connected to the node between the choke coil 13 and the drain of rectification-side synchronous rectifier 8.

The early turn-off signal generator circuit 53 generates an early turn-off signal when the reverse current detector 43 detects a reverse current. The drive transformer 54 supplies the early turn-off signal as a switch drive signal to the switching element 55. The configuration of the reverse current detector 43 is similar to that described in the first to third preferred embodiments.

Figure 10A:
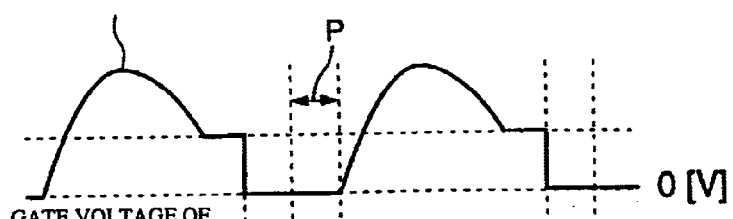
FIG. 10 is a time chart describing the operation of the DC-DC converter of the fourth preferred embodiment of the present invention.
Figure 10B:
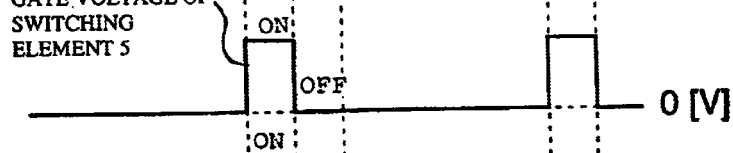
Figure 10C:
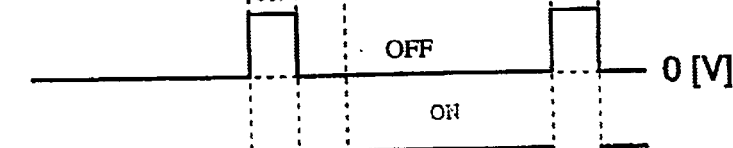
Figure 10D:
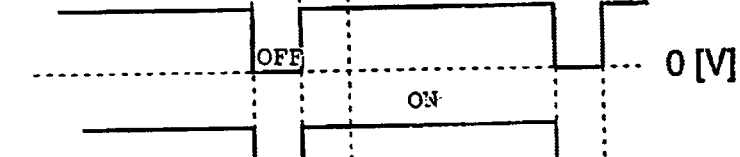

As shown in FIG. 10(c), the rectification-side synchronous rectifier 8 is turned ON and OFF in synchronization with the ON and OFF operation of the switching element (main switching element) 5 (see FIG. 10(b)). In contrast, the operation of the commutation-side synchronous rectifier 10 is opposite to the operation of the main switching element 5. In other words, when the main switching element 5 is turned ON, the commutation-side synchronous rectifier 10 is turned OFF, and when the main switching element 5 is turned OFF, the commutation-side synchronous rectifier 10 is turned ON. In this circuit configuration, the normal circuit operation is performed with the switching element 55 being turned OFF.

Referring to FIG. 10, portion (a) denotes the drain voltage of the main switching element 5, portion (b) denotes the gate voltage of the main switching element 5, portion (c) denotes the ON/OFF operation states of the rectification-side synchronous rectifier 8 in the normal operation state in which no reverse current flows, and portion (d) denotes the ON/OFF states of the commutation-side synchronous rectifier 10 in the normal operation state in which no reverse current flows.

Figure 10E:
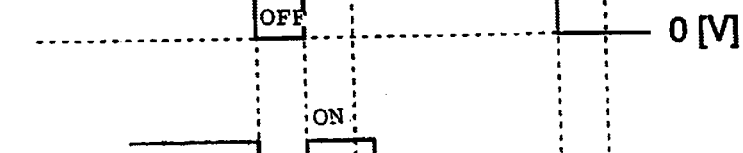
Figure 10F:
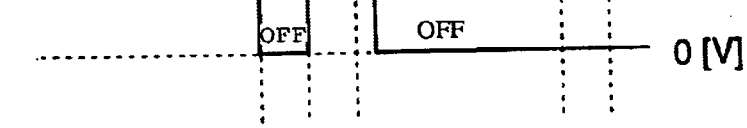

When the early turn-off signal is supplied from the early-turn off signal generator circuit 53 through the drive transformer 55 to the switching element 55, the switching element 55 is turned ON. As shown in FIG. 10(f), the commutation-side synchronous rectifier 10 is turned off early without being controlled by a synchronous rectifier drive circuit, and the commutation-side synchronous rectifier 10 remains off, thus cutting off the flow of reverse current. As a result of the reverse current cut-off, the circuit operation can be stopped in a failure state in which a reverse current flows.

In the example shown in FIG. 9, the early turn-off signal is output from the early turn-off signal generator circuit 53 when the reverse current detector 43 detects a reverse current. Alternatively, a normal off signal can be output, and, as shown in FIG. 10(e), after a reverse current is detected, the turning off of the commutation-side synchronous rectifier 10 at a normal time is awaited. Subsequently, the turn off state can be maintained.

In the fourth preferred embodiment, when a reverse current is detected, the commutation-side synchronous rectifier 10 is forced to be turned off, and the turn off state is maintained for a period during which the reverse current flows. Thus, a failure due to the reverse current can be prevented. In the fourth preferred embodiment, the choke coil 13 may be of type with a variable inductance that varies depending on the current flowing. Alternatively, as shown in a known example, an inductance element such as a normal choke coil with a constant inductance, irrespective of the current flowing, can be used.

The present invention is not limited to the foregoing preferred embodiments and is intended to cover various modifications and equivalent arrangements. For example, although the control terminal voltage of the switching element is continuously detected in the first and second preferred embodiments, the control terminal voltage can be detected indirectly through the drive transformer and the impedance element. Also, a signal in synchronization with the control terminal voltage can be created and detected in the control circuit. As long as DC-DC converters use the phenomenon unique to the reverse current operation, in which the ON-drive voltage of the switching element is less than the threshold value and the drain voltage of the switching element is low, in order to detect a reverse current, these DC-DC converters are also included in the scope of the present invention.

Although the DC-DC converter in the foregoing preferred embodiments is a forward converter, the present invention is applicable to other types of converters other than the forward converter, such as a half bridge converter and a push-pull converter. Although the foregoing preferred embodiments have been described using the insulated DC-DC converter by way of example, the present invention is applicable to a non-insulated DC-DC converter such as a step-down converter. Although the DC-DC converter in the foregoing preferred embodiments is a single-output DC-DC converter, the present invention can be applied to multiple-output DC-DC converters. The circuit configuration of the rectifying/smoothing circuit 40, the output voltage detecting circuit 41, the control circuits are not limited to those described in the foregoing preferred embodiments.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A DC-DC converter for converting an input voltage at an input-output conversion ratio and for outputting the converted voltage to a load, comprising:

a switching element, the input voltage being converted in response to switching operation of the switching element, and the input-output conversion ratio being determined by the switching operation of the switching element;

a choke coil, through which converted voltage is applied to the load;

a reverse current detector for detecting a reverse current flowing from an output side to an input side of the DC-DC converter; and a reverse current suppressor suppressing the amount of reverse current flowing when a reverse current is detected; wherein the choke coil has a function of increasing the inductance when the current is within a current operating range that is less than or equal to a predetermined value and decreasing the inductance when the current is in a current operating range that exceeds the predetermined value; and the choke coil includes a core which easily becomes locally magnetically saturated, and the choke coil has swinging characteristics in which the inductance decreases when the amount of current flowing through the choke coil becomes a predetermined value or greater, thus causing local magnetic saturation in the core.

2. A DC-DC converter according to claim 1, further comprising a synchronous rectifier.

3. A DC-DC converter according to claim 2, wherein the reverse current suppressor turns off the synchronous rectifier or brings forward the time at which the synchronous rectifier is turned off, when a reverse current is detected.

4. A DC-DC converter according to claim 1, further comprising a rectification-side synchronous rectifier and a commutation-side synchronous rectifier.

5. A DC-DC converter according to claim 4, wherein the rectification-side synchronous rectifier and the commutation-side synchronous rectifier each includes a MOSFET.

6. A DC-DC converter according to claim 1, wherein the reverse current detector comprises:

a first detector detecting a control terminal voltage of the switching element; and a second detector directly or indirectly detecting the voltage across the switching element; wherein in a case in which the control terminal voltage of the switching element is at a level at which the switching element is turned off and the voltage across the switching element is low, it is determined that the case corresponds to a reverse current state.

7. A DC-DC converter according to claim 1, wherein the reverse current suppressor suppresses the amount of reverse current flowing by controlling the input-output conversion ratio, which is determined by the switching operation of the switching element, in the increasing direction when a reverse current is detected.

8. A DC-DC converter according to claim 1, wherein the switching element includes a MOSFET.

9. A DC-DC converter according to claim 1, wherein the reverse current detector includes a capacitor, a plurality of resistors, and a plurality of diodes.

10. A DC-DC converter according to claim 1, wherein the reverse current suppressor includes a PNP transistor and a resistor.

11. A DC-DC converter according to claim 1, wherein the reverse current suppressor includes a diode.

12. A DC-DC converter according to claim 1, wherein the reverse current detector is connected to a drain of the switching element.

13. A DC-DC converter according to claim 1, further comprising an output voltage detecting circuit having diodes, wherein the reverse current detector is connected to a node between anodes and the diodes of the output voltage detecting circuit.

14. A DC-DC converter for converting an input voltage at an input-output conversion ratio and for outputting the converted voltage to a load, comprising;
 a switching element, the input voltage being converted in response to switching operation of the switching element, and the input-output conversion ratio being determined by the switching operation of the switching element;
 a choke coil, through which converted voltage is applied to the load;
 a reverse current detector for detecting a reverse current flowing from an output side to an input side of the DC-DC converter; and
 a reverse current suppressor suppressing the amount of reverse current flowing when a reverse current is detected; wherein
 the choke coil has a function of increasing the inductance when the current is within a current operating range that is less than or equal to a predetermined value and decreasing the inductance when the current is in a current operating range that exceeds the predetermined value; and
 the choke coil includes an inductor which has a small inductance and which is difficult to magnetically saturate and an inductor which has a large inductance and which is easy to magnetically saturate connected in series to each other.

15. A DC-DC converter according to claim 14, further comprising a synchronous rectifier.

16. A DC-DC converter according to claim 15, wherein the reverse current suppressor turns off the synchronous rectifier or brings forward the time at which the synchronous rectifier is turned off, when a reverse current is detected.

17. A DC-DC converter according to claim 4, further comprising a rectification-side synchronous rectifier and a commutation-side synchronous rectifier.

18. A DC-DC converter according to claim 17, wherein the rectification-side synchronous rectifier and the commutation-side synchronous rectifier each includes a MOSFET.

19. A DC-DC converter according to claim 14, wherein the reverse current detector comprises:
 a first detector detecting a control terminal voltage of the switching element; and
 a second detector directly or indirectly detecting the voltage across the switching element; wherein
 in a case in which the control terminal voltage of the switching element is at a level at which the switching element is turned off and the voltage across the switching element is low, it is determined that the case corresponds to a reverse current state.

20. A DC-DC convener according to claim 14, wherein the reverse current suppressor suppresses the amount of reverse current flowing by controlling the input-output conversion ratio, which is determined by the switching operation of the switching element, in the increasing direction when a reverse current is detected.

21. A DC-DC converter according to claim 14, wherein the switching element includes a MOSFET.

22. A DC-DC converter according to claim 14, wherein the reverse current detector includes a capacitor, a plurality of resistors, and a plurality of diodes.

23. A DC-DC converter according to claim 14, wherein the reverse current suppressor includes a PNP transistor and a resistor.

24. A DC-DC converter according to claim 14, wherein the reverse current suppressor includes a diode.

25. A DC-DC converter according to claim 14 wherein the reverse current detector is connected to a drain of the switching element.

26. A DC-DC converter according to claim 14, further comprising an output voltage detecting circuit having diodes, wherein the reverse current detector is connected to a node between anodes and the diodes of the output voltage detecting circuit.

27. A DC-DC converter for converting an input voltage at an input-output conversion ratio and for outputting the converted voltage to a load, comprising:
 a switching element, the input voltage being converted in response to switching operation of the switching element, and the input-output conversion ratio being determined by the switching operation of the switching element;
 an inductance element, through which converted voltage is applied to the load;
 a synchronous rectifier;
 reverse current detector detecting a reverse current flowing from an output side to an input side of the DC-DC converter; and
 reverse current suppressor suppressing the amount of reverse current flowing when a reverse current is detected; wherein
 the reverse current suppressor includes at least one of a disconnector turning off the synchronous rectifier and a timer bringing forward the time at which the synchronous rectifier is turned off when a reverse current is detected; and
 the inductance element includes a core which easily becomes locally magnetically saturated, and the inductance has swing characteristics in which the inductance decreases when the amount of current flowing through the inductance element becomes a predetermined value or greater, thus causing local magnetic saturation in the core.

28. A DC-DC converter according to claim 27, wherein the reverse current detector comprises:
 a first detector detecting a control terminal voltage of the switching element; and
 a second detector directly or indirectly detecting the voltage across the switching element; wherein
 in a case in which the control terminal voltage of the switching element is at a level at which the switching element is turned off and the voltage across the switching element is low, it is determined that the case corresponds to a reverse current state.

29. A DC-DC converter according to claim 26, wherein the reverse current suppressor suppresses the amount of reverse current flowing by controlling the input-output conversion ratio, which is determined by the switching operation of the switching element, in the increasing direction when a reverse current is detected.

30. A DC-DC converter for converting an input voltage at an input-output conversion ratio and for outputting the converted voltage to a load, comprising:

a switching element, the input voltage being converted in response to switching operation of the switching element, and the input-output conversion ratio being determined by the switching operation of the switching element;

an inductance element, through which converted voltage is applied to the load;

a synchronous rectifier;

reverse current detector detecting a reverse current flowing from an output side to an input side of the DC-DC converter; and reverse current suppressor suppressing the amount of reverse current flowing when a reverse current is detected; wherein the reverse current suppressor includes at least one of a disconnector turning off the synchronous rectifier and a timer bringing forward the time at which the synchronous rectifier is turned off when a reverse current is detected; and the inductance element includes an inductor which has a small inductance and which is difficult to magnetically saturate and an inductor which has a large inductance and which is easy to magnetically saturate connected in series to each other.

31. A DC-DC converter according to claim 30, wherein the reverse current detector comprises:

a first detector detecting a control terminal voltage of the switching element; and a second detector directly or indirectly detecting the voltage across the switching element; wherein in a case in which the control terminal voltage of the switching element is at a level at which the switching element is turned off and the voltage across the switching element is low, it is determined that the case corresponds to a reverse current state.

32. A DC-DC converter according to claim 30, wherein the reverse current suppressor suppresses the amount of reverse current flowing by controlling the input-output conversion ratio, which is determined by the switching operation of the switching element, in the increasing direction when a reverse current is detected.

* * * * *